US009531752B2

(12) United States Patent
Gribble et al.

(10) Patent No.: US 9,531,752 B2
(45) Date of Patent: *Dec. 27, 2016

(54) DETECTION OF SPYWARE THREATS WITHIN VIRTUAL MACHINES

(71) Applicant: University of Washington through its Center for Commercialization, Seattle, WA (US)

(72) Inventors: Steven Gribble, Seattle, WA (US); Henry Levy, Seattle, WA (US); Alexander Moshchuk, Seattle, WA (US); Tanya Bragin, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,170

(22) Filed: Apr. 22, 2015

(65) Prior Publication Data

US 2015/0326607 A1 Nov. 12, 2015

Related U.S. Application Data

(63) Continuation of application No. 13/488,222, filed on Jun. 4, 2012, now Pat. No. 9,043,913, which is a (Continued)

(51) Int. Cl.
*G06F 11/00* (2006.01)
*H04L 29/06* (2006.01)
(Continued)

(52) U.S. Cl.
CPC ....... *H04L 63/1483* (2013.01); *G06F 9/45558* (2013.01); *G06F 21/53* (2013.01);
(Continued)

(58) Field of Classification Search
CPC ............. H04L 63/1483; H04L 63/1416; G06F 9/45558; G06F 21/53; G06F 21/566
See application file for complete search history.

(56) References Cited

U.S. PATENT DOCUMENTS 6,643,641 B1 11/2003 Snyder
7,080,073 B1 7/2006 Jiang et al.
(Continued)

OTHER PUBLICATIONS

Wang, Yi-Min, et al., "Automated Web Patrol with Strider Honey Monkeys: Finding Web Sites That Exploit Browser Vulnerbilities." Microsoft Research, Technical Report, First Version: Jun. 4, 2005, Last Updated: Jul. 27, 2005, 15 pages.

*Primary Examiner* — Techane Gergiso
(74) *Attorney, Agent, or Firm* — Perkins Coie LLP

(57) ABSTRACT

A system analyzes content accessed at a network site to determine whether it is malicious. The system employs a tool able to identify spyware that is piggy-backed on executable files (such as software downloads) and is able to detect "drive-by download" attacks that install software on the victim's computer when a page is rendered by a browser program. The tool uses a virtual machine (VM) to sandbox and analyze potentially malicious content. By installing and running executable files within a clean VM environment, commercial anti-spyware tools can be employed to determine whether a specific executable contains piggy-backed spyware. By visiting a Web page with an unmodified browser inside a clean VM environment, predefined "triggers," such as the installation of a new library, or the creation of a new process, can be used to determine whether the page mounts a drive-by download attack.

20 Claims, 5 Drawing Sheets

Related U.S. Application Data continuation of application No. 11/426,370, filed on Jun. 26, 2006, now Pat. No. 8,196,205.

(60) Provisional application No. 60/787,804, filed on Mar. 31, 2006, provisional application No. 60/761,143, filed on Jan. 23, 2006.

(51) Int. Cl.
  *G06F 9/455* (2006.01)
  *G06F 21/53* (2013.01)
  *G06F 21/56* (2013.01)
  *G06F 21/55* (2013.01)

(52) U.S. Cl.
  CPC ........ *G06F 21/566* (2013.01); *H04L 63/1416* (2013.01); *G06F 21/554* (2013.01); *G06F 2009/45587* (2013.01); *H04L 63/14* (2013.01); *H04L 63/1491* (2013.01)

(56) References Cited

U.S. PATENT DOCUMENTS

| | | |
|---|---|---|
| 7,519,902 B1 | 4/2009 | Kraft et al. |
| 7,725,937 B1 | 5/2010 | Levy |
| 8,489,846 B1 * | 7/2013 | Jensen .................... G06F 21/74 711/173 |
| 2003/0195950 A1 | 10/2003 | Huang et al. |
| 2003/0212902 A1 | 11/2003 | Van Der Made |
| 2003/0229900 A1 | 12/2003 | Reisman |
| 2004/0064736 A1 | 4/2004 | Obrecht et al. |
| 2004/0255165 A1 | 12/2004 | Szor |
| 2005/0138427 A1 | 6/2005 | Cromer et al. |
| 2005/0182940 A1 | 8/2005 | Sutton et al. |
| 2005/0273856 A1 | 12/2005 | Huddleston |
| 2005/0283640 A1 | 12/2005 | Cheston et al. |
| 2006/0021029 A1 | 1/2006 | Brickell et al. |
| 2006/0021054 A1 | 1/2006 | Costa et al. |
| 2006/0031673 A1 | 2/2006 | Beck et al. |
| 2006/0069663 A1 | 3/2006 | Adar et al. |
| 2006/0075278 A1 | 4/2006 | Kallahalla et al. |
| 2006/0112342 A1 * | 5/2006 | Bantz ...................... G06F 21/50 715/736 |
| 2006/0112416 A1 | 5/2006 | Ohta et al. |
| 2006/0161982 A1 | 7/2006 | Chari et al. |
| 2006/0206300 A1 | 9/2006 | Garg et al. |
| 2006/0236127 A1 | 10/2006 | Kurien et al. |
| 2007/0050766 A1 | 3/2007 | Pomerantz |
| 2007/0074192 A1 | 3/2007 | Geisinger |
| 2007/0136579 A1 | 6/2007 | Levy et al. |
| 2007/0186212 A1 | 8/2007 | Mazzaferri et al. |
| 2007/0256073 A1 | 11/2007 | Troung et al. |
| 2009/0271867 A1 * | 10/2009 | Zhang .................. G06F 21/566 726/24 |
| 2013/0014259 A1 | 1/2013 | Gribble et al. |

* cited by examiner

CHECKING EXECUTABLES FOR PIGGY-BACKED SPYWARE

DETECTION OF SPYWARE THREATS WITHIN VIRTUAL MACHINES

CROSS-REFERENCE TO RELATED APPLICATION(S)

This application is based on a prior copending provisional applications, Ser. No. 60/761,143, filed on Jan. 23, 2006, and Ser. No. 60/787,804, filed Mar. 31, 2006, the benefit of the filing date of which is hereby claimed under 35 U.S.C. §119(e).

STATEMENT REGARDING FEDERALLY SPONSORED RESEARCH

This invention was funded at least in part with a grant (No. CNS 0430477) from the National Science Foundation (NSF), and the U.S. government may have certain rights in this invention.

BACKGROUND

In the span of just a few years, spyware has become the Internet's most "popular" download. A recent scan performed by America Online/National Cyber Security Alliance (AOL/NCSA) of 329 customers' computers found that 80% were infected with spyware programs. More shocking, each infected computer contained an average of 93 spyware components. As used herein and in the claims that follow, a definition of the term "spyware" provided by the online encyclopedia Wikipedia™ is applied. Wikipedia™ defines spyware as "a broad category of malicious software designed to intercept or take partial control of a computer's operation without the informed consent of that machine's owner or legitimate user." Wikipedia™ further notes that "while the term [spyware] taken literally suggests software that surreptitiously monitors the user, it has come to refer more broadly to software that subverts the computer's operation for the benefit of a third party." Adware, which displays advertising for a service or product, may be a form of spyware, if it is installed without a user's consent. Most users are willing to accept the display of sponsored popup advertising as a necessary result of being enabled to visit a Web page that provides a desired benefit at no other cost to the user. However, if the adware installs any software component on a user's computer without the user's knowledge or agreement, or continues displaying advertising when the user is accessing other sites, the adware is properly viewed as spyware.

While specific spyware may be designed to simply gather information that would generally be viewed as innocuous, such as logging the Web pages that a user visits for purposes of more effectively targeting advertising to customers, other forms of spyware can deliver unsolicited pop-up advertising when the user visits unrelated Web pages that don't benefit from sponsored advertising that is displayed, or the spyware can surreptitiously gather personal information about a user, including a user's social security number or credit card numbers, or can change a user's home page, or redirect Web page requests entered by a user to a different Web site, e.g., one that solicits the user to access pornography.

The consequences of spyware infections can be severe, and can include inundating the spyware victim with pop-up ads that open faster than a user can close them, or enabling the victim's financial information to be used by a third party to purchase merchandise or withdraw funds from a user's bank account, or for stealing passwords. Another form of spyware that is sometimes referred to as "malware" may even render the victim's computer useless. At the very least, the spyware installed on a computer diverts system and processor resources away from the tasks desired by a user and can dramatically slow computer response time in carrying out those tasks or in loading the desktop. In many cases, the user will not even be aware of what is causing these problems, since the installation of the spyware is done without the user's consent and knowledge.

Spyware typically installs itself surreptitiously through one of two methods. First, a user might choose to download software to which piggy-backed spyware code has been attached. For example, a user may initiate download of a desired utility file, and the piggy-backed spyware will be included with the download and automatically installed when the utility program is installed. Piggy-backed spyware is particularly common with file-sharing software. The file-sharing Kazaa™ system alone has been the source of hundreds of millions of spyware installations. Second, a user might visit a Web page that invisibly performs a "drive-by download" attack (sometimes also referred to herein as a "drive-by installation"), exploiting a vulnerability in the user's browser to install software without the user's consent. In each case, it is unlikely that the user will have any indication that spyware has been installed. It is only when the adverse effect of the spyware is experienced that a user may become aware that the spyware installed on the computer is preventing the user's computer from working as it did before becoming infected.

In previous work related to spyware, passive network monitoring was used to measure the extent to which four specific adware programs had spread through computers on the University of Washington campus. In a report of this work, the spyware problem was studied from a different perspective. Specifically, the study measured the extent to which: (1) executable Web content contains spyware; and, (2) Web pages contain embedded drive-by download attacks. Both studies confirmed the existence of a significant spyware problem.

The AOL/NCSA online safety study mentioned above conducted a poll of 329 households and also examined their computers for the presence of spyware. Over half of the respondents believed their machines were spyware-free. In reality, 80% of computers scanned were infected with spyware programs. The AOL/NCSA study did not attempt to identify how these computers became infected.

A recent edition of the "Communications of the ACM" contained over a dozen articles on the spyware problem. These articles discuss issues such as the public perception of spyware, security threats caused by spyware, and frameworks for assessing and categorizing spyware programs.

Many projects have examined the detection, measurement, and prevention of malware, such as worms and viruses. Some of their techniques may ultimately be applicable to the detection and prevention of spyware. None of the current approaches for identifying Web pages that install spyware are able to detect such a Web page on-the-fly, in real time, as a user is about to open the Web page in a browser or download an executable file.

Although a number of different commercially available programs can be employed to scan a computer system to detect known spyware, by the time that the spyware is thus detected and removed, the user may have experienced significant problems and the efficient operation of the user's computer may have been adversely impacted. An active Internet user can unknowingly be exposed to multiple sources of spyware each day, so that even if a spyware scanning program is used each evening while the computer is not otherwise in use, the spyware installed that day may already have adversely impacted the user before it can be detected and removed.

Accordingly, in addition to identifying Web pages that carry out drive-by installation of spyware and executable files that include piggy-backed spyware based on Web crawling by a dedicated entity, it would be desirable to seamlessly detect spyware in real time and on-the-fly, before it is installed on a user's computer system. It would also be desirable to provide this detection without the interaction of the user and to preclude the user from downloading Web pages and executable files that install spyware. In some cases, it may be desirable to detect the spyware in real time using a centralized computing device to which a user's computing device is connected. Alternatively, it may instead be desirable, for example for home use, to enable the user's computing device to detect spyware threats from Web pages and/or executable files before they are accessed by the user, or to employ some combination of these approaches.

SUMMARY

A system has been developed that looks for and identifies spyware-infected executables and Web pages on the Internet. In regard to executable files, the system implements an automated solution that addresses three problems. These problems are: (1) determining whether a Web object contains executable software; (2) downloading, installing, and executing that software within a virtual machine without direct user interaction; and, (3) analyzing whether the installation and execution of the software caused a spyware infection. In one exemplary prototype embodiment discussed below, a high performance infrastructure was employed to solve these problems so that a large number of executables from a variety of sources could be analyzed in a reasonable amount of time. FIG. 1 shows a flowchart that illustrates the steps that the system takes in order to perform an analysis on an executable file. The following discussion describes each of these steps in detail.

There are several advantages provided by exemplary embodiments of the present concept, compared to the current approach taken by others. First, the present technique can examine executable file content for piggy-backed spyware programs in addition to examining Web pages for drive-by download attacks. Second, the study using this technique provides a rich analysis of the spyware that was encountered, including the areas of the Web that are most infected, and the fraction of spyware that contains malicious functions, such as modem dialing or Trojan downloading. Third, this study examined how spyware on the Web has changed over time. Fourth, the susceptibility of the Firefox™ browser to drive-by downloads was evaluated in the study, in addition to that of the Microsoft Internet Explorer™ (IE) browser.

A further aspect of this approach is directed to a system to combat both methods of spyware infection noted above and to prevent a user's computer from becoming infected with spyware, while the user is accessing a site on a network. An embodiment of the system transparently performs an on-the-fly analysis of: (1) executables that the user is attempting to download; and, (2) Web pages that the user is visiting, in order to detect piggy-backed spyware and drive-by download attacks before they can affect the user's computer. In at least some embodiments, the analysis is performed in real-time, generally as discussed above in connection with the approach used to carry out the study. It is also contemplated that instead of using VM running on a centralized computing device (e.g., a server that provides the real-time analysis for one or more computers in a network), other embodiments may create and provide a clean operating system within a VM running on the user's computer to perform the analysis in real-time, on-the-fly.

If the system detects spyware or a drive-by download attack at a Web site, it blocks the associated malicious content from reaching the user's computer (i.e., from being installed on or adversely affecting the user's computing system), preventing the spyware or other type of related malware from causing harm. However, if an executable file is found not to include any piggy-backed spyware or if a Web page is not found to be attempting a drive-by installation of spyware or other undesired malware, the system permits the content to be accessed by the user's computer. Further details of the system and of the approach used therein are discussed below.

To block the malicious content, a plug-in or other type of software module may be installed to work with a browser program being operated by the user to visit sites on the Internet or other network and will be configured to control the browser program to inhibit the completion of a Web page download and rendering or the download of an executable file, until the analysis of the Web page or the executable file can be carried out on-the-fly, and it is determined that no spyware or other adverse software installation will result if the browser program is allowed to complete the download and rendering of the Web page or the download of the executable file. An object being downloaded by a user can also be downloaded to a "sandbox," so that the user's computer is protected from the object until the VM environment determines that it is safe to move the object from the sandbox to be rendered in the user's Web browser (if a Web page), or installed on the user's computer (if an executable file).

Since the on-the-fly analysis of a Web page or executable file may slightly delay the rendering of safe Web pages or the download of safe executables, in at least some exemplary embodiments, it may be desirable to download the Web page/executable file into the VM environment and into the user environment in parallel. In this case, the download and rendering of the Web page or the download of the executable file into the user environment would not be enabled to complete until the analysis of the Web page or executable is completed in the VM environment.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

BRIEF DESCRIPTION OF THE DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DETAILED DESCRIPTION

Figures and Disclosed Embodiments are Not Limiting

Exemplary embodiments are illustrated in referenced Figures of the drawings. It is intended that the embodiments and Figures disclosed herein are to be considered illustrative rather than restrictive.

Spyware-Infected Executables on the Web

Figure 1:
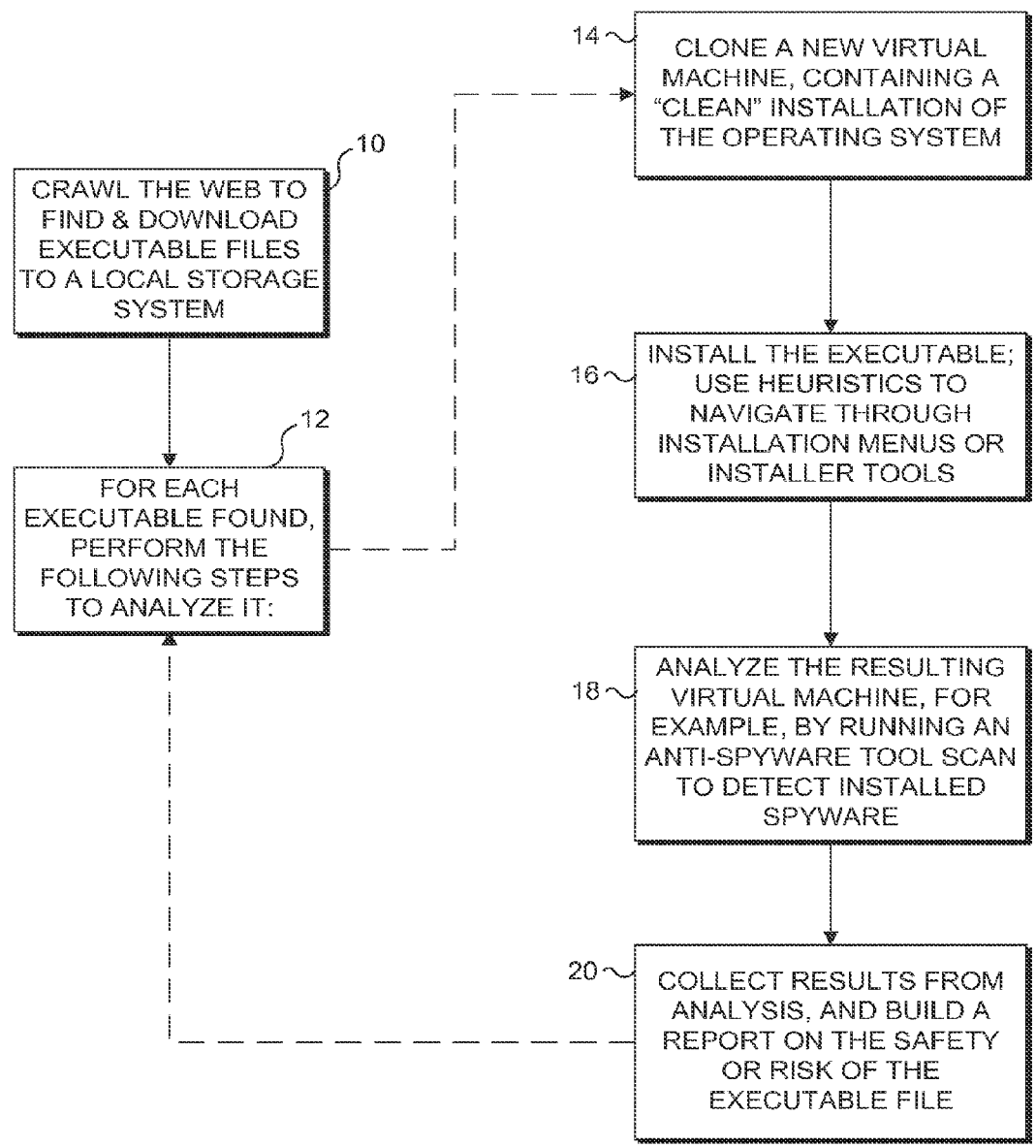
FIG. 1 is a flowchart illustrating the logical steps taken by an exemplary embodiment of an executable file analysis tool and the accompanying text describes the steps taken in this embodiment of the present approach to analyze executable files from the Web, in order to determine whether they contain piggy-backed spyware.

FIG. 1 illustrates the steps that are carried out in an exemplary embodiment of a system that was configured to crawl the Web (or any other designated network) to identify executable files that attempt to carry out installation of spyware or other undesired software instructions. A step 10 indicates that a crawling program was used to search the Web to find executable files at various Web sites and download the executable files to a local storage system, e.g., to a hard drive.

In a study performed using an exemplary prototype of the technology discussed below, it was assumed that a Web object was an executable if either: (1) the Content-type hypertext transfer protocol (HTTP) header provided by a Web server when downloading the object was associated with an executable (e.g., application/octet-stream); or, (2) its URL contained an extension known to be associated with executables and installers (e.g., .exe, .cab, or .msi). Once a Web object was downloaded, well-known signatures at the beginning of the file were looked at to help identify its type. If a file's type could not be identified, it was assumed that it was not an executable and need not be analyzed. While such an assumption may miss some executables, it rarely produces false positives. Accordingly, applying this assumption may underestimate the number of executable files on the Web, but is unlikely to overestimate the number.

Some executable files on the Web are not immediately obvious to a Web crawler. Two instances of this are executables embedded in archives (such as compressed ZIP files), and executables whose URLs are hidden in JavaScript. To handle the first case, archive files were downloaded and extracted, while looking for filenames with extensions associated with executables. To handle the second case, the Web crawler scanned JavaScript content looking for URLs and added them to the list of pages to crawl.

Note that JavaScript programs can dynamically construct URLs when interpreted. Since the Web crawler does not execute JavaScript code, it missed any executables that might have been dynamically constructed using JavaScript.

Running Executables within a VM

As indicated in a step 12 in FIG. 1, for each executable found, a number of steps were carried out to analyze the executable file. Each executable file that was downloaded was installed and run in a clean VM, as indicated in a step 14. This approach was challenging; while it is simple to run a "naked" executable file, software is often distributed using an installer framework, such as Windows Installer™ Unfortunately, installers typically interact with users, requiring them to perform manual tasks such as agreeing to an End User License Agreement (EULA), filling in demographic information, pressing buttons to begin the installation process, or indicating agreement to proceed with default options.

To automate the execution of installer frameworks, a software tool was developed that uses heuristics to simulate common user interactions, as indicated in a step 16. For example, some of these heuristics identify and click on permission-granting buttons such as "next," "OK," "run," "install," or "I agree." Other heuristics identify and select appropriate radio buttons or check-boxes by looking for labels commonly associated with EULA agreements. The tool also looks for type-in boxes that prompt a user for information, such as name or email address, and fills in the boxes with dummy information. While this tool cannot handle all installation scenarios perfectly, it was verified that the tool successfully navigates all popular installer frameworks and it was rarely seen to fail in completing an executable installation.

Since this exemplary approach and study focused on Windows™ executables, for each executable that was analyzed in the study, a VM was first created that contained a clean Windows XP™ guest operating system (OS) image. To provide the clean guest virtual machine environment and OS, the "snapshot take" and "snapshot revert" functions provided in VMware Workstation 5.0™ running on a Linux™ host OS were used. For each node within a cluster, a pool of VMs was maintained on a plurality of computers. When it was desired to analyze an executable, a VM from this pool was allocated, the VM was rolled-back to a clean checkpoint to ensure that no residual changes due to the installation of a previous executable remained, the executable or installer image was injected into the VM, and the tool was employed to automatically install and execute the program using the heuristic capability, so that user intervention was not required.

Analyzing the Installed Executable and its Effect(s) on the VM Environment

Once an executable was installed and run in a VM, the final challenge was to determine whether that executable had infected the VM with spyware, as indicated in a step 18. To make this determination in this exemplary embodiment, the Lavasoft AdAware™ anti-spyware tool was automatically run in the VM, using scripts to launch the tool and collect the infection analysis from the logs that was produced. The log information that was collected in a step 20 of FIG. 1 was sufficiently rich to identify specific spyware programs that were installed. Using online databases of previously identified spyware programs, the functions that those spyware programs contained, such as keystroke logging, adware, Trojan backdoors, or browser hijacking were also manually classified. Of course, AdAware can detect only those spyware programs that have signatures included within its detection database. Accordingly, this analysis missed spyware programs that AdAware did not find. Also note that only information was collected about spyware software that was installed. Although many anti-spyware tools such as AdAware also identify malicious cookies or registry entries as spyware threats, these were excluded, so as to focus only on spyware software. To speed up the AdAware sweep, the Windows XP image installed in the VM was pruned to eliminate non-essential and unnecessary functionality and features, so that it contained as few files and ran as few components as possible. The host firewall and automatic updates were also disabled, so as not to interfere with the analysis or with installation of spyware in the VM environment.

Performance

The executable analysis infrastructure was hosted on a ten-node cluster consisting of dual-processor, 2.8 GHz Intel Corp. Pentium 4™ machines, each with 4 GB of RAM and single 80 GB, 7200 RPM hard drives. On average, it took 92 seconds to create a clean VM, install an executable, run it, and perform an AdAware™ sweep. Of this time, around 1-2 seconds was spent creating the VM, 55 seconds was required for installing and running the executable in the VM, and 35 seconds performing the AdAware™ sweep of the VM environment after the executable was installed and run. By parallelizing the analysis to run one VM per processor in the cluster, it was possible to analyze 18,782 executables per day, in this exemplary test configuration. In practice, it was found that the bottleneck of the system, i.e., the slowest part of the process, was crawling the Web to find and download executables, rather than analyzing the executables that were thus found.

Exemplary Results from using the Tool

The Heritrix™ public domain Web crawler was used to gather a crawl over 2,500 Internet Web sites in this study. To understand how spyware had penetrated different regions of the Web, sites from eight different categories were crawled, including: adult entertainment sites, celebrity-oriented sites, game-oriented sites, kids' sites, music sites, online news sites, pirate/warez sites, and screensaver or "wallpaper" sites. In addition, Clnet's™ download.com shareware site, which provides a large number of downloadable executables, was crawled.

appreciably over the five month period between the two crawls. Overall, it was found that as of October 2005, approximately 1 in 20 of the executable files that were identified during the crawl contained spyware, an indication of the extent of the spyware problem.

Drive-By Downloads

The following section describes the design and implementation of those parts of the system that look for drive-by download attacks on the Web. A drive-by download attack occurs when a victim visits a Web page that contains malicious content, i.e., tries to install spyware or attempts to modify the computing environment in a manner that the user considers undesirable. An example is JavaScript embedded in hypertext markup language (HTML) for a Web page that is designed to exploit a vulnerability in the victim's Web browser program. A successful drive-by download lets the attacking Web page install and run arbitrary software on the victim's computer. The primary challenge in detecting drive-by attacks is performing an automated analysis of content on a Web page to determine whether it contains attack code. Fortunately, a simple solution was found: it was assumed that a drive-by download attack would attempt to break out of the security sandbox implemented by the Web browser program, e.g., by modifying system files or modifying/adding (OS) registry entries. To recognize such an attack, the Web page was rendered using an unmodified browser program running in the VM, and an attempt was made to detect when the sandbox provided by the normal constraints of the Web browser program had been violated.

Figure 2:
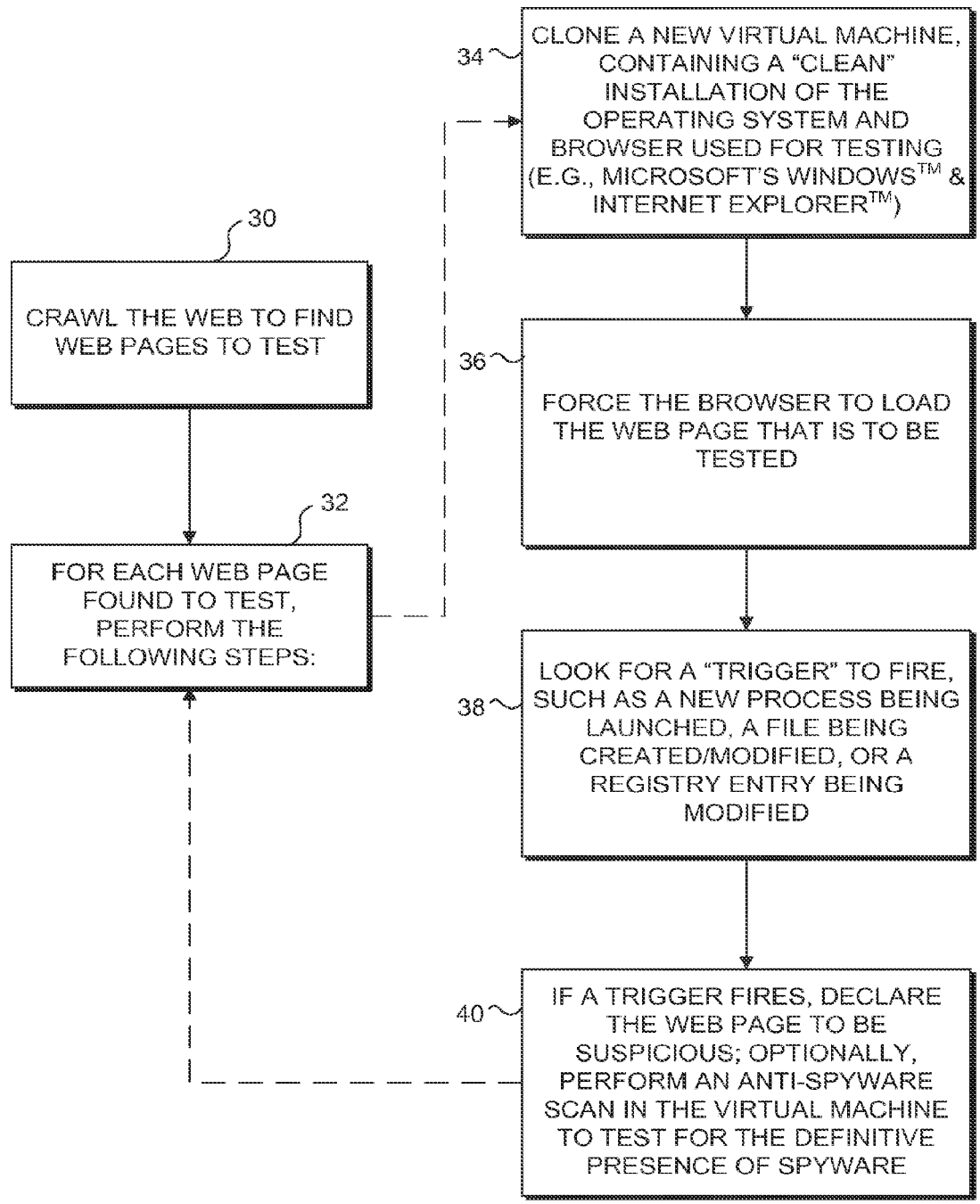
FIG. 2 is a flowchart illustrating the logical steps taken by an exemplary embodiment of a drive-by download attack detection tool and indicating the steps taken in an embodiment of this novel approach to find and analyze Web pages to determine whether they perform a drive-by attack, and/or whether they install spyware.

The flowchart of FIG. 2 illustrates the steps that an exemplary embodiment of the present approach employed in order to perform an analysis of a Web page to determine if it was attempting a drive-by download of spyware or attempting to perform other malicious and undesired acts. This approach also used a crawler program to crawl the Web or other designated network, searching for pages in a markup language (e.g., HTML) to test, in a step 30. For each Web (or other page in markup language format) that was found, a step 32 performed a plurality of steps to determine

TABLE 1

Executable file results. The number of pages crawled, domains crawled, executables analyzed, and infected executables found during the study of executable files on the Web, as discussed herein.

| crawl date | URLs crawled | domains crawled | executables found | domains w/ executables | infected executables | infected domains | unique spyware programs |
|---|---|---|---|---|---|---|---|
| May 2005 | 18,237,103 | 2,733 | 21,200 | 529 (19.1%) | 2,834 (13.4%) | 106 (3.8%) | 82 |
| October 2005 | 21,855,363 | 2,532 | 23,694 | 497 (19.6%) | 1,294 (5.5%) | 111 (4.4%) | 89 |

Table 1 shows the high-level results from the executable file evaluation of this study. Over 18 million URLs were crawled in May 2005 and nearly 22 million URLs in October 2005. In both crawls, executable files were found in approximately 19% of the crawled Web sites, and spyware-infected executables in about 4% of the sites. While the absolute number of spyware-infected executables dropped substantially between the crawls, this result is due primarily to a single site whose number of infected executables declined from 1,776 in May 2005, to 503 in October 2005. Except for that Web site, the amount of spyware found did not change if the page was at least attempting to carry out a drive-by installation of spyware or other undesired and malicious program code. In a step 34, for each Web page found in the exemplary embodiment, a new VM was cloned containing a clean installation of the operating system and of a browser program selected for testing. For example, an initial study was made using the Microsoft Windows™ operating system, with Microsoft's Internet Explorer browser program running in the VM environment. In a step 36, the browser program running in the VM environment was forced to load the Web page that was to be tested.

TABLE 2

Trigger conditions. If any of these trigger conditions
occurs within the guest OS, the associated URL is
marked as suspicious and a spyware scan is run.
Trigger Condition Process creation: a new process is launched, excluding know browser helper processes.
File system activity: a file is created or modified, excluding those in "safe" folders such as the browser cache, browser cookies, system event logs, and paths associated with helper processes.
A suspicious process writes to a file: a process besides the browser and its known help processes creates or modifies any file.
Registry activity: sensitive registry entries are modified, such as those that control programs that are launched on reboot, browser helper objects (BHOs) loaded with the browser runs, initialization scripts that are executed when certain programs are launched, etc.
Browser or OS crash: the browser or OS crash, or otherwise stop responding to events.

Detecting Browser Program Sandbox Violations

The method employed in this exemplary embodiment for detecting browser program sandbox violations was based on the notion of event triggers, as indicated in a step 38. An event trigger fires when an event matching a predefined trigger condition occurs in the guest OS or in an application running on it. For example, if visiting a Web page (i.e., rendering the Web page in the browser program) causes file-system activity to occur outside of a small set of prescribed folders associated with the browser (such as its local cache), a trigger will fire. Table 2 describes the trigger conditions that were defined and implemented for detecting drive-by downloads in this study.

In the VM environment, precise control is maintained over the software that runs in the guest OS. This approach causes the number of trigger conditions that are generated by the base software to be reduced. For example, the guest OS can be configured to disable all unnecessary background system services, which increases the likelihood that a trigger firing is the result of a drive-by download and not due to some "normal" aspect of the OS or the VM environment. However, some of the predefined trigger conditions can occur naturally and not due to drive-by attacks, e.g., from essential or other background services that were not disabled, or from OS or browser program crashes. In addition, not all drive-by downloads install spyware; instead, some install benign software that is not adverse to the user. Accordingly as indicated in a step 40, in this prototype embodiment, only when a trigger fired (i.e., when one of the predefined events was detected), was the Web page that was just downloaded and rendered by the browser program considered to be suspicious. An AdAware™ anti-spyware scan of the VM was performed to detect installed spyware or to confirm that spyware or other malicious changes have been made in the VM environment. After the test of a Web page was completed, the results were logged and the next Web page found by the crawler program was tested in a similar manner, i.e., by looping back to step 32.

It is contemplated that in some embodiments, it may be desirable to not employ the optional anti-spyware program scan and simply rely upon the detection of any of the plurality of predefined triggers to indicate whether the last Web page rendered in the browser has possibly installed spyware or made some other malicious change to the VM environment. Also, it is contemplated that appropriate predefined triggers can be selected to determine if the Web page tried (even if not successful), to install spyware or make other malicious changes to the VM environment.

As a performance optimization, an attempt was made to reduce the number of new VMs that must be created. Therefore, in this exemplary prototype embodiment, while crawling Web pages to scan for drive-by downloads, the system continued loading Web pages within the same browser and VM environment until any of the predefined triggers fired or 100 Web pages had been visited. In either case, garbage collection was performed on the VM environment, and a new VM environment was created from the clean, check-pointed VM image. In practice, it was observed that at least one of the plurality of predefined triggers was found to have fired sufficiently often that the 100-page limit was rarely reached.

Dealing with Complex Web Content

Some Web pages contain scripted content that could confound this analysis. One example is a "time bomb" used by some drive-by attacks; when a browser program renders the Web page, JavaScript within the Web page causes the browser program to set a timer that will trigger some activity (such as a page load) at some defined time in the future. As another example, some Web pages contain JavaScript that is executed when the Web page closes. As a third example, some Web pages cause popup windows to open, which in turn, may contain malicious code. The effect caused by the pop-up could thus be experienced when another URL is rendered, causing the spyware installation to be detected at that time. If these complexities are mishandled, a trigger firing could potentially be attributed to the incorrect URL.

To deal with time bombs, the virtual time (i.e., time within the VM environment) was sped up on the guest OS by a factor of about fifteen in this exemplary prototype embodiment. Thus, each second of actual (real-world) time that elapsed corresponded to fifteen seconds of elapsed time on the guest OS and as experienced by the applications running within the VM environment. All time bombs that were observed in drive-by downloads had a "fuse-length" (i.e., a time before the malicious action began to occur) of less than fifteen seconds, so this approach ensured that at least a second of actual time elapsed between fetching one URL and beginning the analysis of the next URL in the same VM, thereby ensuring that any predefined trigger activated by a previously rendered Web page would be correctly attributed to that Web page.

Coping with page-close code that only began to install spyware or take some other malicious act when the Web page providing the code was closed is straightforward. Before concluding the analysis of a URL, the browser was caused to fetch a known, clean Web page, thereby triggering the page-close handlers of the previous Web page. The trigger activated in response to the event arising from the malicious act was thus attributed to the correct Web page.

To correctly handle pop-up windows, the OS in this exemplary embodiment waited for all pop-up windows to finish loading and then closed them in order to trigger any page-close JavaScript handlers associated with the pop-ups. Some pop-up windows caused an endless sequence of additional pop-up windows to be opened. In this case, the system iterated through the pop-up closing procedures ten times before halting the analysis for that URL, identifying the URL as a source of spyware or other malicious acts, and resetting the VM image to a clean state, so that all changes made to the previous VM environment were cleared.

Several additional complexities were handled, including dealing with browser dialog boxes that prompt the user for input (e.g., when a Web page asks the user to accept a license agreement or to agree to change their default home page). A set of automated heuristic solutions to this and other problems was developed, to respond automatically, without need for user interaction.

Browser Configuration

Two different browser configurations were analyzed in this study, both based on Microsoft Corporation's Internet Explorer™ (IE) version 6.0, running on Windows XP™ without either Service Pack 1 (SP1) or SP2 installed. Unpatched versions of Windows XP™ were deliberately chosen to run, since the majority of existing exploits attack vulnerabilities in such older system configurations. In addition, most (but not all) newly found exploits affect both patched and unpatched systems.

For the first configuration (cfg_y), the browser behaves as though the user grants permission in all security-related Microsoft IE™ dialog boxes. For example, when a Web page tries to download and run ActiveX controls, IE requests the user's approval for the action. Sometimes a Web page attempts to "push" an executable file to the user's computer, using either inline JavaScript or pop-up windows. In this case as well, IE asks for permission to install or run the executable.

For the second configuration (cfg_n), the browser behaves as though the user refuses permission in security-related dialog boxes. Spyware that installs itself despite the user's refusal typically exploits browser flaws, bypassing IE's security framework.

None of the URLs examined in this portion of the study linked to executable content. Accordingly, any spyware infections found were the result of a drive-by download. Note that if an executable were installed in the cfg_n configuration, the user will not have the opportunity to refuse the installation, and, in most cases, no notification will occur, which is the most malicious form of a drive-by download, i.e., simply visiting a Web page will cause an executable to be installed and run on the victim's system— all without user consent and knowledge.

Performance

Using the same cluster of machines described above, it was found that analyzing a single Web page took on average 6.3 seconds, including restarting the browser and loading the page and its pop-ups. For those Web pages that fire a trigger, performing an AdAware™ anti-spyware scan took on average, an additional 108 seconds. It was observed that 5% of Web pages caused a trigger to fire, leading to an average latency of 11.7 seconds per page. Two VM environments could be run per CPU without loss of performance, and accordingly, approximately 14,769 pages were analyzed per CPU per day.

Exemplary Results for the Tool

Some high-level results from exemplary Web crawls using the drive-by download attack detection tool are shown in Table 3. In the May crawl, with IE configured to say "yes" to security prompts, 2,675 URLs in 46 domains caused spyware infections. With IE configured to say "no," 690 infectious URLs were found in 16 domains. That is, 1.5% of the URLs that were crawled in May 2005 exploited Microsoft IE security flaws to install spyware without prompting the user. While this may seem like a small percentage, consider that one in 67 Web pages that were examined contained malicious content targeting browser flaws.

The examination of the same URLs in October 2005 saw a reduction in the number of drive-by attacks, with the drop significantly more pronounced for the cfg_n configuration, i.e., with IE configured to say "no." Many of the Web pages and domains that previously exploited browser vulnerabilities no longer did so. For example, of the 690 cfg_n infectious URLs found in May, only 37 were still infectious in October. Through manual examination, it was found that some of the formerly infectious sites had been removed, some were still functioning but had substantially changed in content, and some had the same user-perceived content, but no longer performed drive-by download attacks.

For comparison, the evaluation also crawled and examined the new set of 45,000 URLs that were generated in October 2005. During this crawl of the Web, both browser configurations, cfg_y and cfg_n, observed a significantly lower number of drive-by download attacks than were found in May 2005. For example, in May, 5.9% of the crawled URLs performed cfg_y attacks and 1.2% of sites performed cfg_n attacks; in October, these percentages dropped to 0.4% and 0.6%, respectively.

Overall, these summary statistics suggest that the density of drive-by download attacks on the Web has declined over the five-month period of the study.

TABLE 3

Drive-by download results. The number of infectious pages and domains found by this drive-by download study. Results for two browser configurations are reported: Microsoft IE configured to automatically say 'Yes" to security dialog boxes (cfg_y), and IE configured to say "no" (cfg_n). Also reported are three traces: the May 2005 crawl, the same URLs from the May trace re-crawled in October 2005, and a new set of URLs gathered and crawled in October 2005.

| | | May 2005 | October 2005 (recrawl May URLs) | October 2005 (new URLs) |
|---|---|---|---|---|
| URLs crawled | | 45,000 | 45,000 | 45,000 |
| domains crawled | | 1,353 | 1,353 | 1,420 |
| unique spyware programs found | | 48 | 26 | 36 |
| say yes to prompts ("cfg_y") | infectious URLs | 2,675 (5.9%) | 1,548 (3.4%) | 186 (0.4%) |
| | infectious domains | 46 (3.4%) | 27 (2.0%) | 23 (1.6%) |
| say no to prompts ("cfg_n") | infectious URLs | 690 (1.5%) | 37 (0.1%) | 92 (0.2%) |
| | infectious domains | 16 (1.2%) | 5 (0.4%) | 9 (0.6%) |

Firefox™ Browser Susceptibility to Spyware Attacks

Thus far in the study, the evaluation had focused on the susceptibility of the Microsoft IE™ browser program to drive-by download attacks. Attention was next turned to the Firefox™ browser program, which is currently the second-most popular browser in use. A common perception about the Firefox™ browser program is that it is more secure against drive-by download attacks, in part because it does not support ActiveX components, a common contributing factor to Microsoft Corp. IE™ browser program vulnerabilities.

To explore this issue, the experimental infrastructure of the exemplary prototype embodiment discussed above was modified, creating a VM instance that contained Firefox™, version 1.0.6 on Windows XP™ OS, with no service packs installed. All of the heuristics previously built for Microsoft's IE™ browser program were replicated, such as those that handle JavaScript "time bombs." Finally, both cfg_y and cfg_n Firefox configurations were created.

In October 2005, a new crawl of the same Web site categories that were explored for the Microsoft Corp. IE™ browser program drive-by download study was made. The methodology for selecting seed domains to crawl was identical to the other crawls, except that the crawler was tuned to favor breadth across sites rather than depth within a site. This step was taken in anticipation of there being far fewer malicious domains that target Firefox™, and accordingly, a determination that exposure to a larger number of domains was needed.

Drive-by downloads with the Firefox ™ browser. Drive-by download attacks that cause spyware infections with the Firefox ™ browser in the October 2005 crawl. The few successful drive-by attacks found used Java applets to attempt to download executables, but required a user to consent to the download.

| | | URLs crawled | domains crawled | infectious URLs | infectious domains |
|---|---|---|---|---|---|
| adult | cfg_y | 5,000 | 744 | 0 | 0 |
| | cfg_n | 5,000 | 744 | 0 | 0 |
| celebrity | cfg_y | 5,000 | 319 | 4 (0.08%) | 1 (0.3%) |
| | cfg_n | 5,000 | 319 | 0 | 0 |
| games | cfg_y | 5,000 | 659 | 0 | 0 |
| | cfg_n | 5,000 | 659 | 0 | 0 |
| kids | cfg_y | 5,000 | 164 | 0 | 0 |
| | cfg_n | 5,000 | 164 | 0 | 0 |
| music | cfg_y | 5,000 | 392 | 7 (0.14%) | 1 (0.26%) |
| | cfg_n | 5,000 | 392 | 0 | 0 |
| news | cfg_y | 5,000 | 136 | 0 | 0 |
| | cfg_n | 5,000 | 136 | 0 | 0 |
| pirate | cfgy | 5,000 | 300 | 25 (0.5%) | 4 (1.6%) |
| | cfg_n | 5,000 | 300 | 0 | 0 |
| wallpaper | cfgy | 5,000 | 272 | 0 | 0 |
| | cfg_n | 5,000 | 272 | 0 | 0 |
| random | cfgy | 5,000 | 4,494 | 0 | 0 |
| | cfg_n | 5,000 | 4,494 | 0 | 0 |

Table 4 shows the results of carrying out the study discussed above with the Firefox™ browser program. Out of the 45,000 URLs examined, 36 (0.08%) were found that performed drive-by spyware installs on the Firefox™ browser program. These spyware installs affected only the cfg_y browser configuration. No cfg_n attacks were found, i.e., no Web pages were observed that exploit any Firefox™ browser program vulnerabilities to install spyware without the user's consent.

The few cfg_y Firefox drive-by downloads that were observed were based on a Java applet created and distributed by Integrated Search Technologies (IST), a developer of several advertising and browser search redirection software products. The Java applet attempts to install a bundle containing several spyware and adware programs, including DyFuCA and SideFind. An applet is normally prevented from installing new software in the Firefox™ browser program by Java's security sandbox. Sun's Java™ Runtime Environment will allow digitally signed applets to run outside the sandbox in some circumstances. In particular, if the applet contains a previously unknown signature, the user is prompted to indicate a decision on whether to trust the applet. If the user agrees, the applet is granted permission to execute outside the sandbox. In this particular example, granting permission results in the installation of spyware.

Exemplary Computing System for Implementing Web Crawler and Spyware Detection

Figure 3:
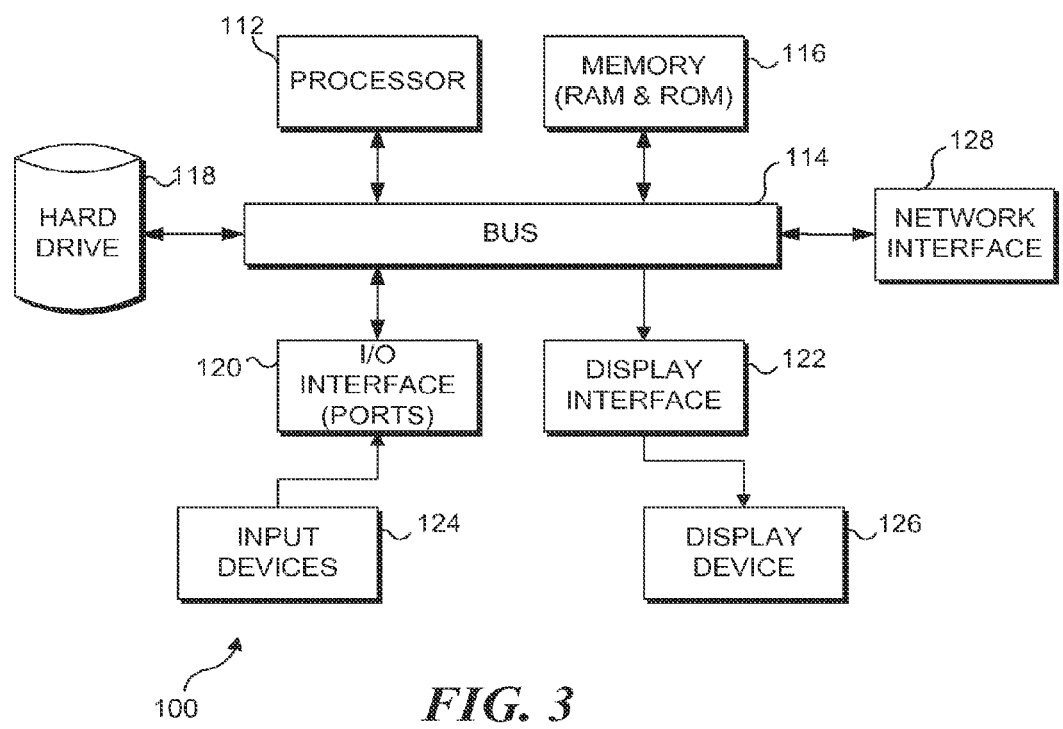
FIG. 3 is a schematic block diagram of a generally conventional computing device that is suitable for use in carrying out the novel approach disclosed herein.

FIG. 3 illustrates an exemplary computing system 100 that is suitable for implementing the Web Crawler and detecting installation of spyware, as discussed above. Computing system 100 includes a processor 112 that is coupled in communication with a generally conventional data bus 114. Also coupled to the data bus are a memory 116 that includes both random access memory (RAM) and read only memory (ROM). Machine instructions are loaded into memory 116 from storage on a hard drive 118 or from other suitable non-volatile memory, such as an optical disk or other optical or magnetic media. These machine instructions, when executed by processor 112 can carry out a plurality of different functions, such as providing a VM environment in which a browser program is executed for crawling the Web.

An input/output (I/O) interface 120 that includes a plurality of different types of ports, such as serial, parallel, universal serial bus, PS/2, and Firewire ports, is coupled to data bus 114 and is in turn, connected to one or more input devices 124, such as a keyboard, mouse or other pointing device, enabling a user to interact with the computing system and to provide input and control the operation of the computing system. A display interface 122 couples a display device 126 to the data bus, enabling the browser program window and other graphic and text information to be displayed for viewing by a user. The computing system is coupled to a network and/or to the Internet (or other network that is to be checked for potential spyware sources) via a network interface 128, which couples to data bus 114. It should be noted that the approach discussed herein is not limited to identifying spyware sources on the Web (or Internet). It should be understood that it can also be used to detect potential sources of spyware (and other types of malicious acts) in HTML pages on other types of networks, including without limitation, local area networks, wide area networks, and on other forms of public and private networks, such as Internet 2.

Web Crawler System

Figure 4:
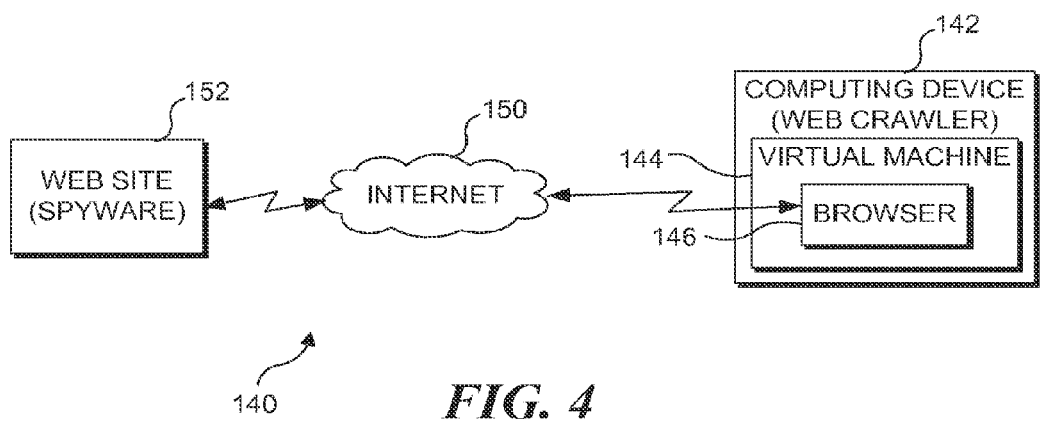
FIG. 4 is a schematic block diagram illustrating use of a browser executed within a virtual machine (VM) environment of one example, and employed to crawl the Web to detect spyware threats.

FIG. 4 illustrates a web crawler system 140 as implemented in a computing device 142 (like computing system 100). To protect the computing device, a VM 144 is created on computing device 142 and within the VM, a browser 146 is executed and used to crawl Internet 150. The browser thus visits Web sites, such as a Web site 152 through the Internet connection, attempting to detect spyware or other sources of malicious activity, as described above.

Basic System Architecture

Figure 5A:
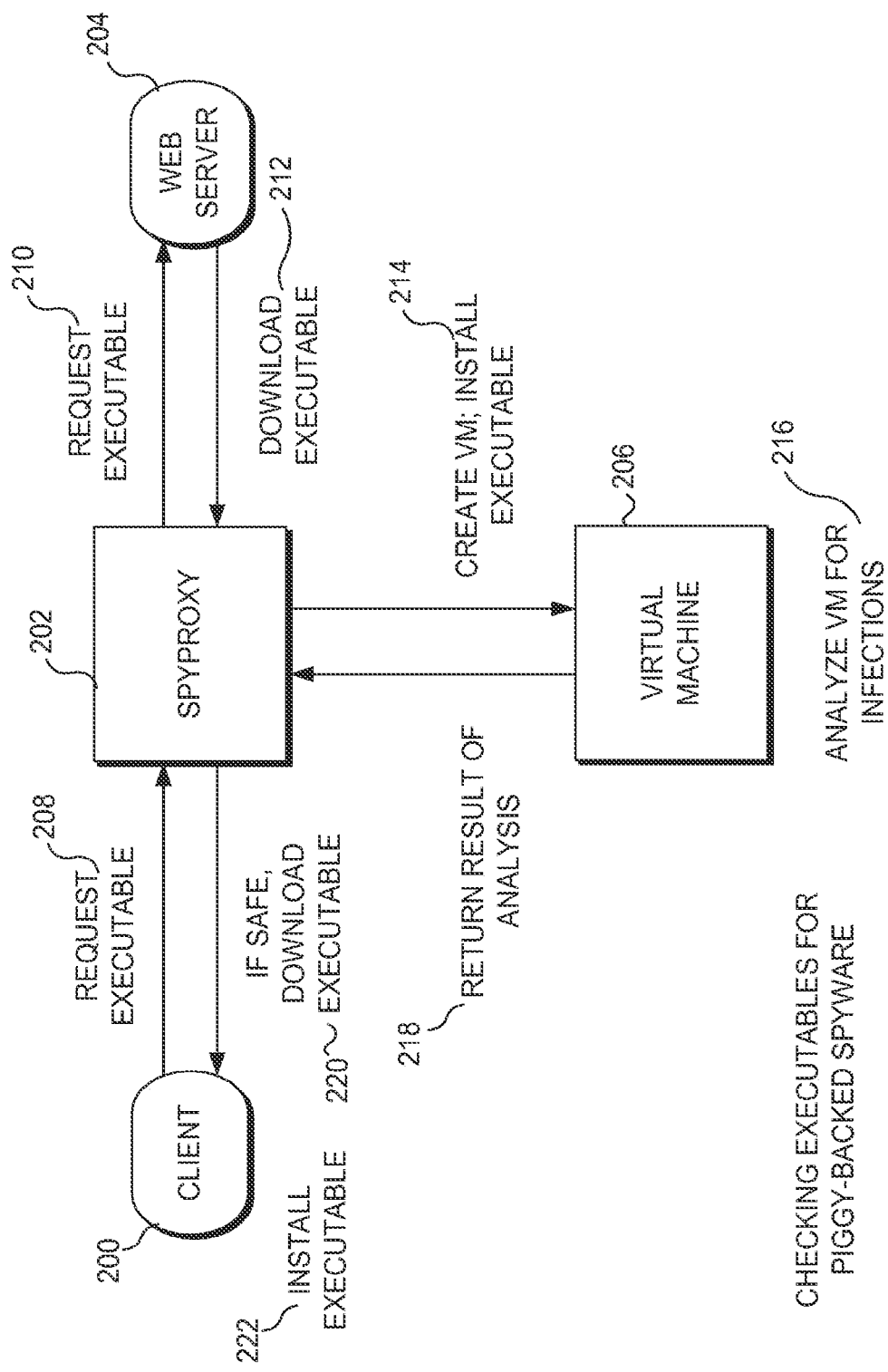
FIG. 5A is a schematic block diagram illustrating the components and the steps employed in an embodiment of the present approach to check executable files requested for download by a user, to determine if the executable files are conveying or attempting to install piggy-backed spyware.
Figure 5B:
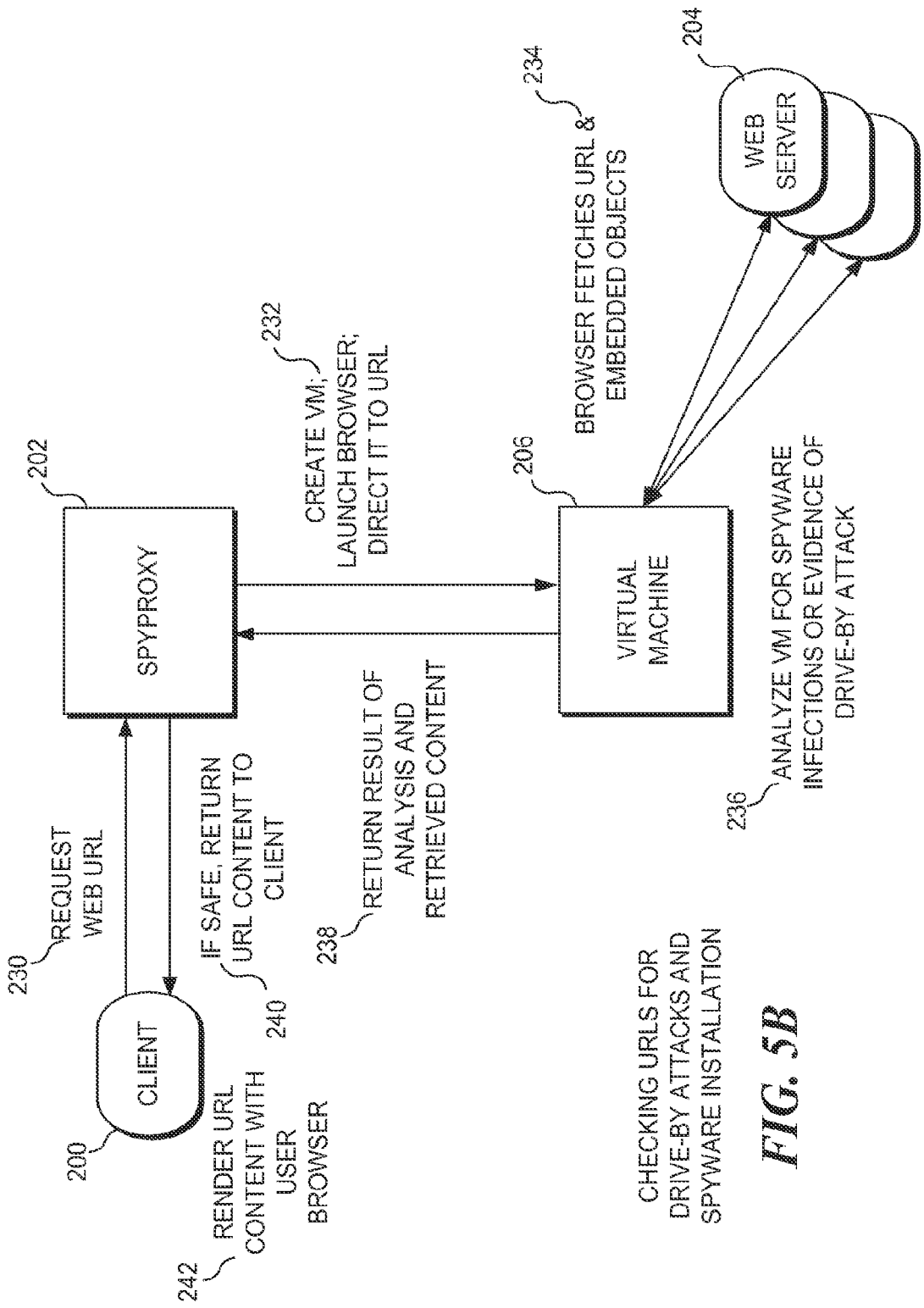
FIG. 5B is a schematic block diagram illustrating the components and the steps employed in the present approach to check uniform resource locators (URLs) requested by a user, to determine if the URLs will cause drive-by attacks and/or install spyware.

In an embodiment of an alternative system (which is referred to herein as "spyproxy"), instead of performing the analysis of the effect of objects on the VMs offline under the direction of a Web crawler, a similar analysis instead is performed on-the-fly, in response to a user requesting a Web page or attempting to download an executable file. A high-level diagram of this alternative system is shown in FIGS. 5A and 5B. While not required, in at least some embodiments, it is contemplated that the analysis will be carried out without any interaction, or even knowledge, by the user.

In the exemplary embodiment that is schematically illustrated in FIG. 5A, a client computer 200 is shown interacting with an exemplary embodiment of the spyproxy system 202, to download an executable file from a Web server 204 in a step 208. The user directs the user's Web browser on the client computer to a URL containing the executable file. In a step 210, the user's Web browser then directs a request for downloading the executable file to associated Web server 204, on which the executable file is stored or from where it is accessible. It will be appreciated that the executable file can be stored at almost any site and accessed over other types of networks, besides the Internet. Transparently to the user (e.g., through browser proxy settings), or transparently to the user and the user's browser program (e.g., through "transparent" TCP proxying at the Internet service provider (ISP)), the request for the executable is intercepted by the spyproxy system.

The spyproxy downloads the executable on behalf of the user in a step 212. Next, in a step 214, the spyproxy creates (or accesses an existing) clean VM 206, running an unmodified guest operating system (such as Microsoft Corporation's Windows XP™, Windows Vista™, or potentially other operating systems, such as Apple Corporation's Mac OS X™ or any of the various Linux™ operating systems, depending, for example, on the operating system that the user's computer is running) The spyproxy installs the executable within that VM environment, and performs an analysis of the VM environment to detect whether piggybacked spyware was installed by the executable file just downloaded and executed, in a step 216. This analysis can use any one or more of a number of commercially available anti-spyware tools, such as AdAware™ or Windows Defender™.

The result of the analysis is communicated to the spyproxy system in a step 218. If spyware is detected in the VM environment, the executable file is dropped, i.e., the download to the user's environment is precluded (and the executable file may be deleted from memory on the computing device running the VM); in addition, the user is notified of the reason why the download of the executable could not be completed. If no spyware is detected, the spyproxy transmits the executable to the user's computer for installation in steps 220 and 222. In this case, the user's perception will be that the download occurred conventionally in the same manner that it would have without using spyproxy.

FIG. 5B shows an analogous situation, but in this case, illustrates an exemplary embodiment for providing on-the-fly analysis of Web page content for drive-by download attacks and to detect any spyware that is installed in a VM environment as a result. To download a Web page, the user typically clicks on a link in a document or in a displayed Web page, or types a URL into the address box of the Web browser program running on the user's computer 200. The user's Web browser sends a request for the associated Web object that was selected or entered to an appropriate Web server 204 that is used to access the Web page in a step 230. Transparently to the user, and potentially, transparently to the user's Web browser, spyproxy system 202 intercepts this Web request. Next, the spyproxy system creates clean VM 206 in which a Web browser program is running in a step 232. Also in step 232, the spyproxy system directs the Web browser running in the VM environment to retrieve and display the URL requested by the user's Web browser program. In a step 234, the Web browser in the VM environment fetches the URL and any embedded object on the requested page. It will be understood that the request may retrieve multiple Web objects, such as would occur if the URL is for a Web page containing a plurality of embedded images, scripts, or other objects. After the Web browser in the VM environment finishes retrieving the page, the spyproxy system analyzes the VM environment for evidence of a drive-by download attack or the installation of spyware in a step 236.

A combination of triggers and anti-spyware scanning can be used for this analysis, in the manner described above. The results of the analysis are communicated to the spyproxy in a step 238. If a drive-by attack or spyware is detected in the VM environment, the requested URL's content is dropped, and the user is notified of the reasons why the requested URL will not be rendered or displayed to the user in the user's Web browser. Conversely, if no drive-by attack or spyware was detected in the VM environment, in a step 240, the requested Web content is transmitted to the user's Web browser, and the user Web browser renders it for the user in the conventional manner in a step 242, just as if spyproxy had not been involved in analyzing the Web content.

Infrastructure-Based Spyproxy Versus Client-Side Spyproxy

The diagram and explanation provided above did not specify the location of the spyproxy and of the VM environment. There are several alternative possibilities. One possibility is that the spyproxy system is run somewhere inside the Internet infrastructure, such as at the border of the client organization (e.g., a campus border router, or a company firewall, or even a home firewall or router), inside the client's ISP (e.g., inside Comcast's network for a cable-modem customer), or at a third-party service provider (e.g., in Akamai's CDN or at a hosting service). A second possibility is that the spyproxy system and VM runs on the client's computer—in what might be referred to as a "client-side proxy." A third possibility is that the spyproxy runs within a VM environment at the Web server, performing an on-the-fly check of content served by that server to client computers that have requested content from the server. Each of these possibilities are contemplated as a potential way in which this technology might be employed, and each may be more advantageous that the others under various circumstances.

Performance Optimizations

As the concept is described above, the spyproxy system is functionally complete. However, the spyproxy would introduce several seconds or tens of seconds of additional download latency to users who are downloading a Web page or an executable file over a network. For executable files, this may be acceptable, since users download executables less frequently than Web pages, and their size implies the user may already be waiting several minutes for an executable to download and be installable. For Web pages, however, this additional latency may be unacceptable, given that users accustomed to relatively fast broadband connection speeds expect their Web pages to download and render in the user's Web browser program within a few seconds.

Accordingly, the spyproxy system can include three performance optimizations, each of which may be used on its own, or in any combination with one or both of the other two optimizations. These optimizations are: caching, transfer pipelining, and the staged release of content.

Caching If the spyproxy has checked an executable file or a Web object in the past, it can cache the result of the check. The next time that a user requests that file or object, the spyproxy checks the cache, and if it finds a cached result, it simply returns that result instead of repeating the processor-expensive and time-consuming analysis in the VM environment. Several challenges must be overcome for this approach to be safe. For example, a change to a Web page or executable may not be evident from the name or path or URL for the object.

The spyproxy must thus ensure that the requested object has not changed since the time of its last check by the spyproxy system. To detect any change in the object, the spyproxy system may also store a cryptographic hash of the object in the cache. When a user requests an object, the spyproxy retrieves the content from the Web server, hashes the object, and compares its hash to the hash that was stored for the object in the past. If the hashes match, the content (probabilistically) has not changed. If they do not match, the content has changed, and the proxy must repeat the full analysis and replace the old cached result with the new, including the new hash result.

Also, the spyproxy may want to ensure that the requested object is deterministic. Some Web objects contain non-deterministic content, such as JavaScript, which fetches additional embedded objects, uses random numbers, or consults the time of day to provide a quasi variable result. Some data types are (almost) always deterministic; examples include embedded images and plain HTML. The spyproxy uses a combination of type-analysis (e.g., is the object of a type that is known to be deterministic, such as an image/jpeg) and static analysis (e.g., does the object contain any content that might be non-deterministic, such as JavaScript that contains operators, which might introduce non-determinism). If the object is of a type known to likely be deterministic, the result cache will probably be checked. Otherwise, the full analysis will likely be performed on the object by the spyproxy system, using the VM environment.

Transfer pipelining In the system description above, no content is sent to the client until the content is retrieved by the spyproxy and checked for safety. One optimization would be to send the content to the client's computer, in parallel with downloading and checking of the object or content in the proxy, effectively pipelining the check of the content with its transfer to the client computer. This optimization is particularly effective if the client's computer is behind a slow network connection. However, for this optimization to be safe, the content must be held aside on the client's computer in a safe "sandbox," or the download prevented from completing, rather than being immediately handed to the user's Web browser for display. Once the spyproxy has finished checking the content and has determined that the content is safe, the spyproxy can then "release" the content from the client-side sandbox or allow the download to complete, to enable the Web page to be rendered in the user's Web browser, or the download of the executable file to complete.

To accomplish transfer pipelining, the spyproxy system must be able to coordinate with the client computer, or at least, with the user's Web browser. This coordination is straightforward and happens "for free" if the spyproxy is running on the client computer. If the spyproxy is in the Internet infrastructure or on the remote Web server, some form of software must be installed and run on the client-side machine in order to enable this functionality. This software can be a Web browser plug-in or module, a client-side proxy, or some other application running on the client. The added client-side software is necessary for the spyproxy software to control the user's Web browser so that it does not use the object that is temporarily consigned to the "sandbox," or complete the download and use of the object, until the spyproxy has determined that the object will not install spyware or implement some other undesired function on the user's computer.

Staged Release of Content In the case of a Web browser requesting a Web page, the Web page may consist of a root HTML page and many embedded objects, such as images, flash movies, scripts, and frames. Rather than waiting for the spyproxy to check all objects before releasing any content to the client's Web browser, instead, these objects can be released as they are checked by the spyproxy. For example, referring to FIG. 5B, as the browser running in the VM has downloaded a particular object and finished rendering it, even if additional objects will be downloaded in the future as part of the Web page, if no triggers have fired on the VM, then that object is safe to release to the client computer to allow the download of the object by the user's Web browser to complete. This "staged release" optimization is particularly effective for complex Web pages that include many embedded objects, such as a newspaper Web page that contains multiple stories, images, and buttons or other controls.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for preventing sources of content that are accessible over a network from installing spyware or other undesired items into a user environment, the method comprising:

producing a virtual machine on a computing device and installing an operating system on the virtual machine to create a virtual machine environment configured to test a potential source of content accessible on the network, to determine if the potential source of content attempts to install spyware;

automatically loading the content from the potential source of content within the virtual machine environment;

determining whether or not the potential source of content has at least attempted to install spyware in the virtual machine environment, by— detecting whether at least one of a plurality of predefined triggers are fired, and in the case where at least one of the plurality of predefined triggers is detected, determining that the potential source of content is at least attempting to perform an attack in the virtual machine environment;

wherein the predefined triggers comprise at least one of— determining which processes of the virtual machine are either a browser process or known helper processes associated with the browser process and detecting that a new process is launched, excluding the browser process and known helper processes;

determining which folders are safe folders and detecting that a file is created or modified outside of the determined safe folders;

determining which processes of the virtual machine are either the browser process or known helper processes associated with the browser process and detecting that a process besides the determined browser process and its known helper processes performed a file creation or modification;

determining which registry entries are sensitive registry entries and detecting that one of the sensitive registry entries is modified;

determining that the browser process or an operating system process has crashed or has stopped responding; or any combination thereof; and communicating results of the determining whether or not the potential source of content has at least attempted to install spyware in the virtual machine environment, the results indicating either that the potential source of content has not at least attempted to install spyware in the virtual machine environment or that the potential source of content has at least attempted to install spyware in the virtual machine environment;

wherein producing the virtual machine, automatically loading the content, and determining whether or not the potential source of content has at least attempted to install spyware are each performed by a spyproxy module executing on a machine remote from a machine executing at least part of the user environment, wherein the machine remote from the machine executing at least part of the user environment comprises at least one of a web-server, an internet service provider, a firewall server, a third-party service provider, or any combination thereof.

2. The method of claim 1, wherein the potential source of content includes a web page component that is configured to be rendered by a browser program, and wherein:

loading the potential source of content within the virtual machine environment comprises— executing the browser program within the virtual machine environment;

requesting the web page from a remote site on the network using the browser program; and loading the web page into the browser program so that it is rendered; and determining whether or not the potential source of content has at least attempted to install spyware in the virtual machine environment comprises— detecting whether at least one of the plurality of predefined triggers fired as a result of the page being loaded into the browser program and rendered; and if at least one of the plurality of predefined triggers is detected, determining that the web page is at least attempting to perform a drive-by attack in the virtual machine environment.

3. The method of claim 2, further comprising, if at least one of the plurality of predefined triggers is detected, executing anti-spyware software within the virtual machine environment to perform a spyware scan of the virtual machine environment to test for a definitive indication that spyware has been installed in the virtual machine environment.

4. The method of claim 1 wherein the potential source of content includes an executable file, and wherein:

loading the potential source of content within the virtual machine environment comprises installing the executable file within the virtual machine environment; and determining whether or not the potential source of content has at least attempted to install spyware in the virtual machine environment comprises analyzing the virtual machine environment after the executable file is installed, to determine if installation of the executable file has caused an attack to be made within the virtual machine environment, the attack comprising executable code that is installed by a software module included with the executable file.

5. The method of claim 4 wherein installing the executable file comprises employing heuristics to emulate a user navigating and making selections in an installation process carried out by the executable file, when the executable file is executed within the virtual machine environment.

6. The method of claim 4 wherein:

analyzing the virtual machine environment comprises executing an anti-spyware software program within the virtual machine environment; and determining whether or not the potential source of content has at least attempted to install spyware in the virtual machine environment comprises employing the anti-spyware software program to analyze the virtual machine environment using predefined criteria, to determine whether installation of the executable file has caused spyware to be installed within the virtual machine environment.

7. The method of claim 1, further comprising, if it is determined that the potential source of content has at least attempted to install spyware in the virtual machine environment, retaining data identifying the potential source of content.

8. The method of claim 1, further comprising disabling, by the operating system on the virtual machine, one or more unnecessary background system services prior to automatically loading the content from the potential source of content within the virtual machine environment.

9. The method of claim 1 wherein the predefined triggers comprise at least:

determining which processes of the virtual machine are either a browser process or known helper processes associated with the browser process and detecting that a new process is launched, excluding the browser process and known helper processes; and/or determining which folders are safe folders and detecting that a file is created or modified outside of the determined safe folders.

10. The method of claim 1 wherein the predefined triggers comprise at least:

determining which registry entries are sensitive registry entries and detecting that one of the sensitive registry entries is modified; and/or determining that the browser process or an operating system process has crashed or has stopped responding.

11. The method of claim 1 wherein the predefined triggers comprise at least determining which processes of the virtual machine are either the browser process or known helper processes associated with the browser process and detecting that a process besides the determined browser process and its known helper processes performed a file creation or modification.

12. A system for preventing sources of content that are accessible over a network from completing an attack in a user environment, the system comprising:

one or more machines remote from a machine executing at least part of the user environment, the one or more machines including a memory and one or more processors coupled to the memory, wherein the one or more processors are configured to execute machine instructions that are stored in the memory, wherein the one or more machines remote from the machine executing at least part of the user environment comprise at least one of: a web-server, an internet service provider, a firewall server, a third-party service provider, or any combination thereof; and an interface coupling the one or more machines to the network;

wherein the machine instructions cause the one or more processors to automatically carry out a plurality of operations using the interface to communicate over the network, including:

creating a virtual machine environment in which to test potential sources of content found on the network to determine if a potential source of content at least attempts an attack, wherein a clean operating system executes within the virtual machine environment;

automatically loading the content from the potential source of content into the virtual machine environment for testing; and determining whether or not the potential source of content has at least attempted an attack in the virtual machine environment, by— detecting whether at least one of a plurality of predefined triggers are fired, and in the case where at least one of the plurality of predefined triggers is detected, determining that the potential source of content is at least attempting to perform an attack in the virtual machine environment;

wherein the predefined triggers comprise at least one of— determining which processes of the virtual machine are either a browser process or known helper processes associated with the browser process and detecting that a new process is launched, excluding the browser process and known helper processes;

determining which folders are safe folders and detecting that a file is created or modified outside of the determined safe folders;

determining which processes of the virtual machine are either the browser process or known helper processes associated with the browser process and detecting that a process besides the determined browser process and its known helper processes performed a file creation or modification;

determining which registry entries are sensitive registry entries and detecting that one of the sensitive registry entries is modified; and determining that the browser process or an operating system process has crashed or has stopped responding;

communicating results of the determining whether or not the potential source of content has at least attempted an attack in the virtual machine environment, the results indicating either that the potential source of content has not at least attempted to install spyware in the virtual machine environment or that the potential source of content has at least attempted to install spyware in the virtual machine environment.

13. The system of claim 12 wherein the machine instructions stored in the memory further cause the processor to:

execute a browser program in the virtual machine environment;

automatically download a page having a component that is capable of being rendered as part of the page by a browser program, the page being loaded into and rendered in the browser program;

detect whether at least one of the plurality of predefined triggers fired as a result of the page being loaded into the browser program and rendered; and if at least one of the plurality of predefined triggers is detected, determine that the page is at least attempting a drive-by attack in the virtual machine environment.

14. The system of claim 13 wherein if at least one of the plurality of predefined triggers is detected, the machine instructions further cause the processor to execute antispyware software within the virtual machine environment to perform a spyware scan of the virtual machine environment and test for a definitive indication that spyware has been installed in the virtual machine environment during the attack.

15. The system of claim 12 wherein the content comprises an executable file, and wherein the machine language instructions further cause the processor to:

install the executable file within the virtual machine environment; and analyze the virtual machine environment after the executable file is installed to determine if installation of the executable file has caused a drive-by attack to be made in the virtual machine environment by the executable file.

16. The system of claim 15 wherein the machine language instructions cause the processor to:

install and execute an anti-spyware software program within the virtual machine environment; and employ the anti-spyware software program to analyze the virtual machine environment using predefined criteria, to determine whether installation of the executable file has caused spyware to be installed within the virtual machine environment.

17. The system of claim 15 wherein to install the executable file, the machine language instructions cause the processor to employ heuristics to emulate a user navigating and making selections in an installation process carried out by the executable file, when the executable file is executed within the virtual machine environment.

18. The system of claim 12 wherein the machine language instructions further cause the processor to define a crawler program and employ the crawler program to access a plurality of sites on the network to search the network for potential attack sources, wherein the crawler program successively follows links on pages on a site, to access other pages and other sites on the network.

19. The system of claim 12 wherein communicating results of the determining whether or not the potential source of content has at least attempted an attack in the virtual machine environment comprises communicating an identification of the potential source of content to a portion of the memory.

20. A non-transitory computer readable memory storing instructions that, in response to being executed by a computing system, cause the computing system to perform operations for preventing sources of content that are accessible over a network from installing spyware or other undesired items into a user environment, the operations comprising:

producing a virtual machine on a computing device and installing an operating system on the virtual machine to create a virtual machine environment configured to test a potential source of content accessible on the network, to determine if the potential source of content attempts to install spyware;

automatically loading the content from the potential source of content within the virtual machine environment;
determining whether or not the potential source of content has at least attempted to install spyware in the virtual machine environment, by—
  detecting whether at least one of a plurality of predefined triggers are fired, and
  in the case where at least one of the plurality of predefined triggers is detected, determining that the potential source of content is at least attempting to perform an attack in the virtual machine environment;
wherein the predefined triggers comprise at least one of—
  determining which processes of the virtual machine are either a browser process or known helper processes associated with the browser process and detecting that a new process is launched, excluding the browser process and known helper processes;
  determining which folders are safe folders and detecting that a file is created or modified outside of the determined safe folders;
  determining which processes of the virtual machine are either the browser process or known helper processes associated with the browser process and detecting that a process besides the determined browser process and its known helper processes performed a file creation or modification;
  determining which registry entries are sensitive registry entries and detecting that one of the sensitive registry entries is modified;
  determining that the browser process or an operating system process has crashed or has stopped responding; or
  any combination thereof; and
communicating results of the determining whether or not the potential source of content has at least attempted to install spyware in the virtual machine environment, the results indicating either that the potential source of content has not at least attempted to install spyware in the virtual machine environment or that the potential source of content has at least attempted to install spyware in the virtual machine environment;
wherein producing the virtual machine, automatically loading the content, and determining whether or not the potential source of content has at least attempted to install spyware are each performed by a spyproxy module executing on a machine remote from a machine executing at least part of the user environment,
wherein the machine remote from the machine executing at least part of the user environment comprises at least one of: a web-server, an internet service provider, a firewall server, a third-party service provider, or any combination thereof.

* * * * *

UNITED STATES PATENT AND TRADEMARK OFFICE
CERTIFICATE OF CORRECTION

PATENT NO. : 9,531,752 B2
APPLICATION NO. : 14/693170
DATED : December 27, 2016
INVENTOR(S) : Steven Gribble et al.

It is certified that error appears in the above-identified patent and that said Letters Patent is hereby corrected as shown below:

On the Title Page

In Column 2, under "Other Publications", Line 2, delete "Vulnerbilities.""" and insert -- Vulnerabilities." --, therefor.

In the Specification

In Column 1, Lines 4-11, delete "CROSS-REFERENCE TO RELATED APPLICATION(S) This application is based on a prior copending provisional applications, Serial No. 60/761,143, filed on Jan. 23, 2006, and Serial No. 60/787,804, filed Mar. 31, 2006, the benefit of the filing date of which is hereby claimed under 35 U.S.C. § 119(e)." and insert -- CROSS-REFERENCE TO RELATED APPLICATIONS This application is a continuation of U.S. Application No. 13/488,222 filed Jun. 4, 2012, now U.S. Patent No. 9,043,913, which is a continuation of U.S. Application No. 11/426,370 filed Jun. 26, 2006, now U.S. Patent No. 8,196,205, which is based on prior provisional applications, Serial No. 60/761,143, filed on Jan. 23, 2006, and Serial No. 60/787,804, filed Mar. 31, 2006, each of which is hereby incorporated in their entireties by reference and the benefit of the filing date of which is hereby claimed under 35 U.S.C. § 119(e). --, therefor.

In Column 6, Line 12, after "Installer™" insert -- . --.

In Columns 11-12, Line 44, delete ""Yes""" and insert -- "Yes" --, therefor.

In Column 13, Line 43, delete "cfgy" and insert -- cfg_y --, therefor.

In Column 13, Line 46, delete "cfgy" and insert -- cfg_y --, therefor.

In Column 13, Line 48, delete "cfgy" and insert -- cfg_y --, therefor.

Signed and Sealed this
Twenty-first Day of March, 2017

Michelle K. Lee
*Director of the United States Patent and Trademark Office*

CERTIFICATE OF CORRECTION (continued)
U.S. Pat. No. 9,531,752 B2

In Column 15, Line 26, after "running)" insert -- . --.

In the Claims

In Column 22, Lines 11-12, in Claim 14, delete "antispyware" and insert -- anti-spyware --, therefor.